United States Patent
Fourie

(10) Patent No.: US 7,248,565 B1
(45) Date of Patent: Jul. 24, 2007

(54) ARRANGEMENT FOR MANAGING MULTIPLE GATEWAY TRUNK GROUPS FOR VOICE OVER IP NETWORKS

(75) Inventor: Henry Louis Fourie, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1135 days.

(21) Appl. No.: 10/145,906

(22) Filed: May 16, 2002

(51) Int. Cl.
*H04M 7/00* (2006.01)

(52) U.S. Cl. ............... 370/235; 370/354; 370/356; 370/401; 370/537; 379/220.01; 379/241; 379/333; 709/229

(58) Field of Classification Search ............ 370/235, 370/236, 352, 353, 537, 395.3, 395.31, 395.42, 370/395.52, 401, 402; 379/240, 290, 241, 379/268, 333, 337, 220.1; 709/229, 244
See application file for complete search history.

(56) References Cited

U.S. PATENT DOCUMENTS

| | | | |
|---|---|---|---|
| 6,330,329 B1 * | 12/2001 | Kovarik | 379/333 |
| 6,614,781 B1 | 9/2003 | Elliott et al. | 370/352 |
| 6,683,877 B1 | 1/2004 | Gibbs et al. | 370/395.2 |
| 6,782,094 B1 * | 8/2004 | Venz et al. | 379/279 |
| 6,982,950 B1 | 1/2006 | Gardner | 370/216 |
| 6,993,011 B1 * | 1/2006 | Kaplan et al. | 370/352 |
| 7,069,331 B2 * | 6/2006 | Tripathi et al. | 709/229 |

* cited by examiner

*Primary Examiner*—Seema S. Rao
*Assistant Examiner*—Shick Hom
(74) *Attorney, Agent, or Firm*—Leon R. Turkevich

(57) ABSTRACT

An IP-based node in communication with IP-based gateway devices is configured for executing circuit selection for a prescribed trunk group having multiple sets of connected trunk groups, the multiple sets of connected trunk groups managed by the respective IP-based gateway devices. The prescribed trunk group is configured for connecting with a two-way trunk group of a switch, for example a PSTN-based switch, having substantially more circuits than any one of the multiple sets of connected trunk groups for the IP-based gateway devices. The IP-based node executes circuit selection at least based on a first message, received from one of the IP-based gateway devices via an IP connection and specifying circuit availability for at least a portion of the corresponding set of connected trunk groups. The IP-based node outputs to the one IP-based gateway device an IP-based selection message specifying a selected circuit within the corresponding set of connected trunk groups, enabling the one IP-based gateway device to select the selected circuit for communication with the switch based on the IP-based selection message.

52 Claims, 8 Drawing Sheets

ARRANGEMENT FOR MANAGING MULTIPLE GATEWAY TRUNK GROUPS FOR VOICE OVER IP NETWORKS

BACKGROUND OF THE INVENTION

1. Field of the Invention

The present invention relates to deployment of Voice over IP (VoIP) networks, more particularly to interfacing trunk groups between VoIP gateways and Public Switched Telephone Network (PSTN) switches while minimizing dual seizure (i.e., glare).

2. Description of the Related Art

Trunk groups between PSTN switches are managed as a set of circuits, each circuit being identified by a Circuit Identification Code (CIC) in ISUP signaling messages. Two-way trunk groups encounter a problem known as glare or dual seizure. In particular, glare occurs where two switches at each end of a given circuit perform their respective circuit selections for a trunk group, and the outcome is that both switches have selected the same circuit.

Once glare between two switches is detected on a circuit, one of the two switches must be allowed to proceed with its call on the circuit, and the other switch must select an alternate circuit and reattempt its corresponding call on the alternative circuit. The action performed by a switch detecting glare depends on whether the switch controls the circuit. For example, various circuit-selection algorithms are defined, e.g. by the International Telecommunications Union Telecommunication Standardization Sector (ITU-T) Q.764 and by the specification Telcordia GR-317-CORE, to minimize glare or dual seizure between two switches.

One option for glare arbitration, specified in Q.764, involves a switch's corresponding assigned point code, where a switch having a higher point code relative to the peer switch controls all the circuits having even-number CICs, and the switch having the lower point code controls all the circuits having odd-number CICs. Another option is to configure one switch to control all even-numbered circuits, and the other switch to control all odd-numbered circuits; still another option is to configure one switch to control all circuits and configure the other switch to control no circuits.

Minimizing glare becomes more problematic for telephony networks implemented using Voice over IP technology, for example H.323 based networks or Session Initiation Protocol (SIP) based networks, because call processing operations are distributed between different IP-based network nodes, as opposed to conventional time-division switches such as 5ESS switch which utilize centralized switching logic.

FIG. 1A is a diagram illustrating an architecture of a 5ESS switch 10, including multiple interface modules 12 having trunk groups 14, the interface modules 12 connected via a time-multiplexed switch 16 that centrally executes the switching logic. A duplex administrative module processor 18 provides centralized routing control and administrative maintenance features: the administrative module processor 18 communicates with the time-multiplexed switch 16 via a message switch 20. Each trunk group 14 of the 5ESS switch 10 may include large numbers of circuits, on the order of 1,000–4000 circuits. Each interface module 12 includes a duplex time-slot interchange (TSI) 22 used for time-division switching (e.g., utilizing 512 time slots), and multiple interface units 24; each time-slot interchange 22 is connected to the time-multiplexed switch 16 using 32 Mbps network control and timing links for transfer of messages between the administrative module processor 18 and the interface modules 12, as well as for voice transmission.

Hence, the centralized switching logic implemented by the time-multiplexed switch 16 enables circuit selection from the entire set 30 of connected trunk groups 30. The centralized switching logic used by time-division switches such as the 5ESS switch, however, requires deployment of substantially large central office facilities that may not be practical for enterprises (e.g., businesses, universities, etc.) that are attempting to implement their own private telephony network.

Voice over IP based systems often are used to provide an economic and scaleable deployment of a telephony-based system using lower cost components as an alternative to time-multiplexed based switches. FIG. 1B is a diagram illustrating interaction between a Voice over IP based system 32 and a conventional time-division switch such as the 5ESS switch 10. In particular, the Voice over IP based system 32, illustrated for example as an H.323 protocol system, includes a gatekeeper 34 and multiple media gateways 36. The gatekeeper 34 is configured for providing admission control, resource management, security, and routing functionality. In particular, the gatekeeper is configured for routing calls to a selected destination gateway 36 (e.g., 36a) via an IP connection 38 based on either static information specified in routing tables internal to the gatekeeper 34, dial plan tables, etc. in the gatekeeper 34, and/or based on the availability of circuits within the respective gateways 36. In particular, each gateway 36 sends to the gatekeeper 34 via the corresponding IP connection 38 Resource Availability Information (RAI) messages (e.g., according to H.323 protocol) that specify service status; hence, if the gatekeeper 34 determines that the circuits of the gateway 36a are unavailable, the gatekeeper 34 may route calls to another gateway (e.g., 36b).

Each gateway 36 is configured for media conversion of RTP data streams, call establishment and release, circuit selection, and number analysis/translation. In particular, each gateway 36 is configured for managing its trunk groups 40 based on internal execution of the circuit selection algorithms described above; hence, each gateway 36 is configured for executing circuit selection for its corresponding set 42 of connected trunk groups 40 independent of the other gateways 36, providing scalability for increasing the number of trunk groups by adding additional gateways 36. Typically each gateway 36 is configured for supporting up to a maximum of 480 circuits with sixteen E1 links, where groups of circuits are assigned to different trunk groups 40.

The gatekeeper 34 is configured for carrier sensitive routing, where the gatekeeper 34 can route to a gateway trunk group 40 configured on a single gateway 36. This arrangement solves the problem of being able to route to a specific PSTN switch 10 which has a large set 30 of connected trunk groups, since multiple gateways 36 can be configured to have trunk groups that interface with the PSTN set 30 of connected trunk groups 14.

However, a problem arises in that the PSTN switch 10 treats the set 30 of connected trunk groups 14 as a single unit during circuit selection within the trunk group set 30, whereas each gateway 36 performs circuit selection on its own corresponding set 42 of connected trunk groups 40 independently from the sets 42 of trunk groups connected on other gateways 36. Hence, there is a concern of glare on both-way trunk groups deployed using the multiple gateways 36.

SUMMARY OF THE INVENTION

There is a need for an arrangement that enables coordinated circuit selection across a group of multiple sets of connected trunk groups managed by respective IP-based gateway devices and used to connect with a single set of connected trunk groups for a switch, where the single set of connected trunk groups has substantially more trunk groups than any one of the sets of connected trunk groups managed by the IP-based gateway devices.

There also is a need for centralized circuit selection between multiple IP-based gateway devices to minimize occurrence of glare on two-way trunk groups managed by the multiple IP-based gateway devices for connection to a PSTN-based switch.

These and other needs are attained by the present invention, where an IP-based node in communication with IP-based gateway devices is configured for executing circuit selection for a prescribed trunk group having multiple sets of connected trunk groups, the multiple sets of connected trunk groups managed by the respective IP-based gateway devices. The prescribed trunk group is configured for connecting with a two-way trunk group of a switch, for example a PSTN-based switch, having substantially more circuits than any one of the multiple sets of connected trunk groups for the IP-based gateway devices. The IP-based node executes circuit selection at least based on a first message, received from one of the IP-based gateway devices via an IP connection and specifying circuit availability for at least a portion of the corresponding set of connected trunk groups. The IP-based node outputs to the one IP-based gateway device an IP-based selection message specifying a selected circuit within the corresponding set of connected trunk groups, enabling the one IP-based gateway device to select the selected circuit for communication with the switch based on the IP-based selection message.

Hence, IP-based gateway devices can be deployed in a scalable manner for connection with a switch via respective sets of connected trunk groups while minimizing occurrences of glare.

One aspect of the present invention provides a method in an Internet Protocol (IP)-based node. The method includes establishing a prescribed trunk group having multiple sets of connected trunk groups coupled to respective IP-based gateway devices, the establishing step including storing trunk group entries within a table, each trunk group entry specifying an address for one of the IP-based gateway devices and an identified one of the connected trunk groups from the corresponding set of connected trunk groups. The method also includes selecting a circuit from a selected one of the connected trunk groups for connection with a switch having a peer trunk group interfacing with the prescribed trunk group, and outputting an IP-based selection message. The IP-based selection message identifies the selected circuit for the connection with the switch, to the corresponding IP-based gateway device configured for controlling the selected one connected trunk group.

Another aspect of the present invention provides a method in an Internet Protocol (IP)-based gateway having a set of connected trunk groups for connection to at least a portion of a peer trunk group of a switch. The method includes sending, to an IP-based node via an IP network, an IP-based message that specifies a trunk group identifier for a group of circuits, and status information for the group of circuits. The method also includes receiving, via the IP network, a call setup message that specifies one of the connected trunk groups, a circuit identifier, and a glare control indicator that specifies a prescribed glare arbitration. The IP-based gateway determines whether the switch is attempting to seize the circuit specified by the circuit identifier for the one connected trunk group, and selectively initiates an outgoing call on the circuit specified by the circuit identifier for the one connected trunk group, based on the determining step and the glare control indicator.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 2:
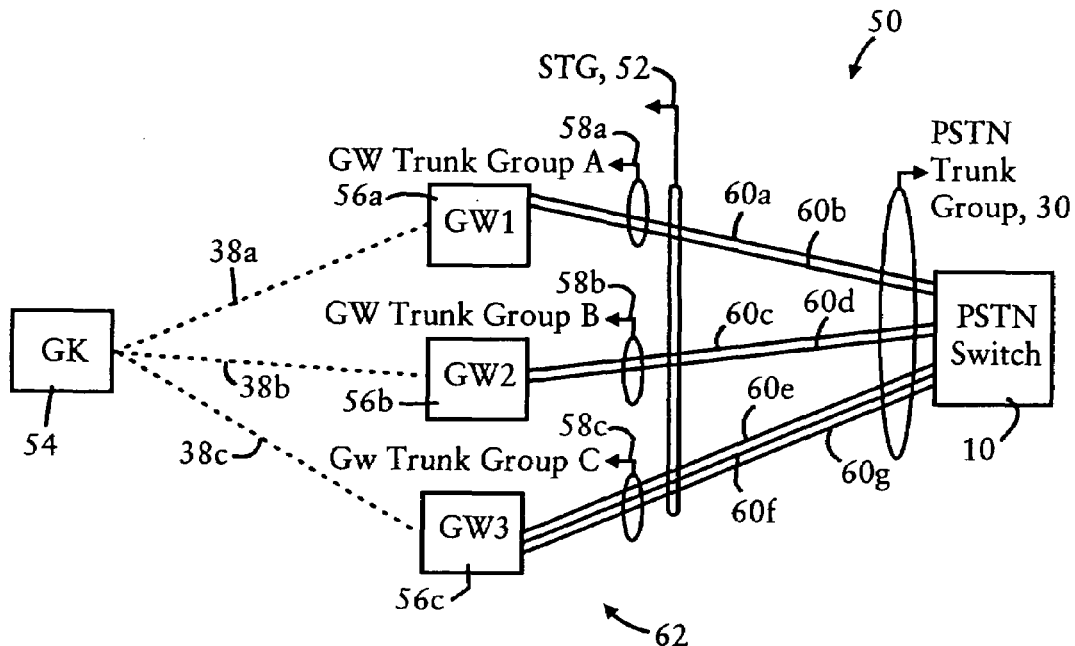
FIG. 2 is a diagram illustrating an arrangement for interfacing a Voice over IP network with a PSTN switch based on managing multiple gateway trunk groups, according to an embodiment of the present invention.

FIG. 2 is a diagram illustrating a system 50 having a PSTN switch 10 with an associated trunk group 30 coupled to a prescribed trunk group 52, also referred to herein as a super trunk group (STG) or a hyper trunk group, established by an IP based node 54 and a plurality of IP-based gateways 56, according to an embodiment of the present invention. The IP-based node 54, implemented for example as a gatekeeper (GK) according to H.323 protocol or a SIP proxy according to SIP protocol, is configured for executing circuit selection on behalf of the gateways 56 based on storing within an internal table attributes that are used to define the super trunk group 52.

Figure 1A:
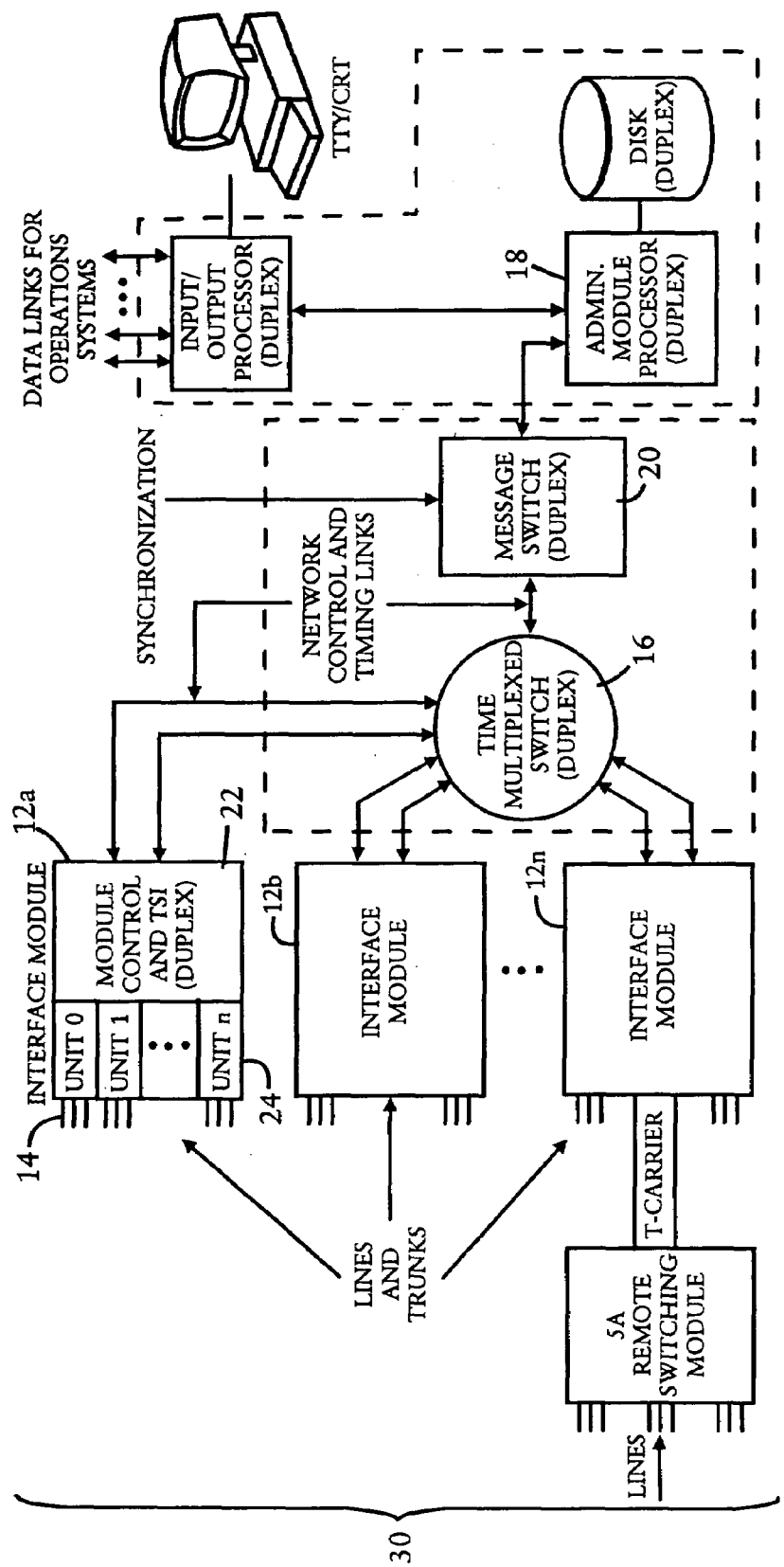
FIGS. 1A and 1B are diagrams illustrating conventional (Prior Art) arrangements for implementing trunk groups using a public switched telephone network (PSTN) switch and a conventional Voice over IP system, respectively.
Figure 1B:
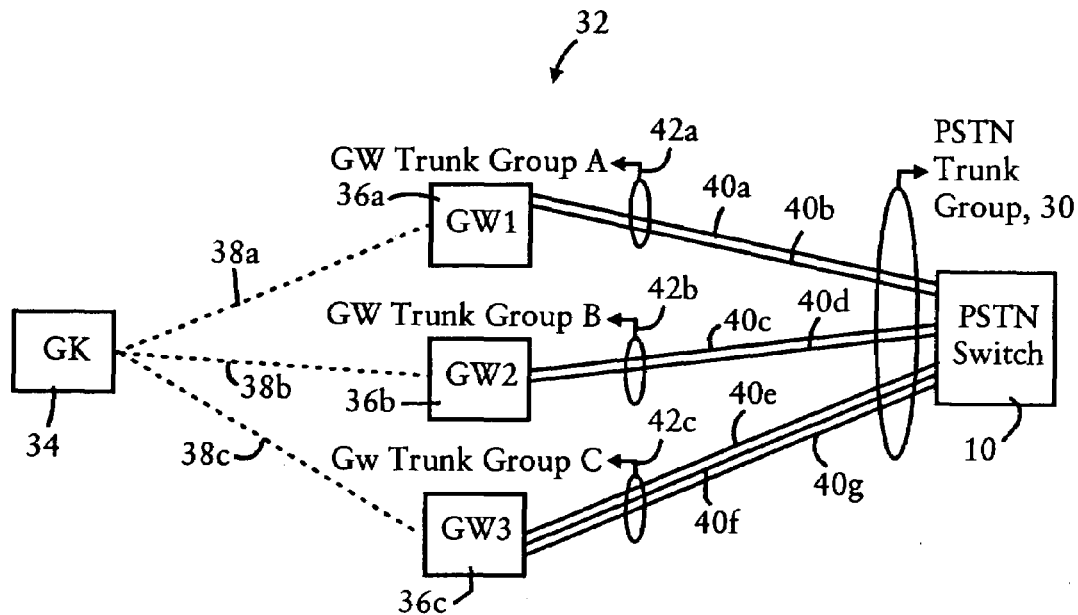

In particular, each gateway device 56 has a corresponding set 58 of connected trunk groups 60 for connection to a portion of the peer trunk group 30 of the switch 10. As described above with respect to FIG. 1B, however, each gateway 56 typically has a limited number of total circuits among the corresponding set 58 of connected trunk groups 60, where the set 58 of connected trunk groups 60 typically totals a few hundred circuits; in contrast, the PSTN trunk group 30 may include on the order of 1,000–4,000 circuits. Hence, any given gateway device 56 is not configured for minimizing glare relative to the entire PSTN trunk group 30.

According to the disclosed embodiment, circuit selection for outgoing calls on the super trunk group 52 is executed by the IP based node 54, based on IP-based status messages received from the gateways 56 via the IP connections 38 in the IP based voice over IP network 62. The status messages received from the gateways 56 may specify status information for a group of circuits for an identified trunk group 60, for example during initial registration of the gateway trunk group 60 with the gatekeeper 54; alternately, a status message may be sent from the gateway 56 that specifies the status of an individual circuit, for example to a circuit failure, or due to detection of call processing conditions (e.g., call release, call unsuccessful, etc.). The IP-based node 54 outputs a VoIP-based circuit selection message to the gateway 56 controlling the selected circuit, enabling the gateway to initiate an outgoing call on the selected circuit. Hence, circuit selection relative to the super trunk group 52 is centralized within the IP based node 54.

In addition, the circuit selection message output by the gateway 56 includes a glare control indicator specifying a prescribed glare control operation to be performed by the destination gateway 56 in response to detection of glare on the identified circuit. Hence, if the gateway 56 receiving the circuit selection message detects that the PSTN switch 10 is attempting to seize the circuit specified within the circuit selection message, the gateway 56 parses the glare control indicator to determine whether the outgoing call by the gateway 56 on the identified circuit has precedence relative to the incoming call from the PSTN switch, and either initiates an outgoing call on the selected circuit or abandons the attempt to initiate the outgoing call on the circuit based on the glare control indicator.

Hence, circuit selection and glare arbitration are managed centrally by the IP-based node 54, enabling deployment of a super trunk group 52 for connection with the PSTN trunk group 30, while maintaining scalability and minimizing the occurrence of glare in the circuits associated with the super trunk group 52.

Figure 3A:
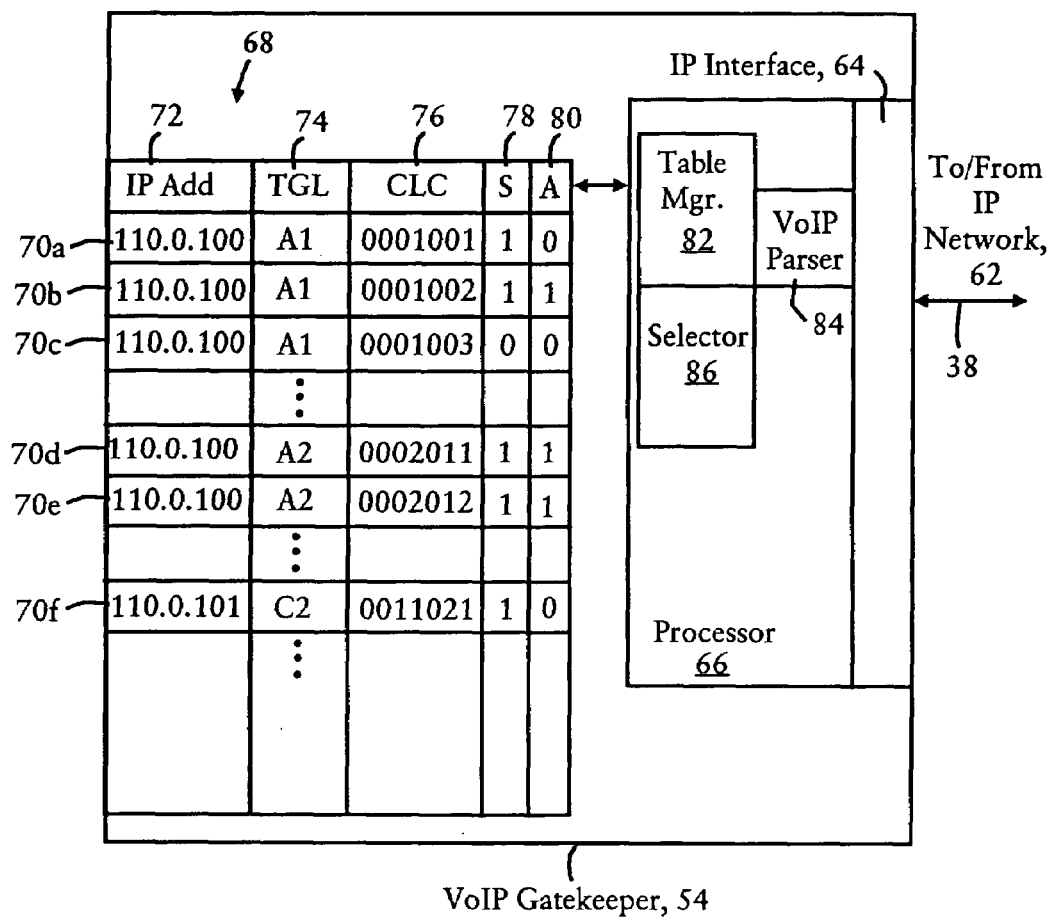
FIGS. 3A and 3B are diagrams illustrating in further detail the gatekeeper and the gateway of FIG. 2, respectively.

FIG. 3A is a diagram illustrating in further detail the IP-based node 54 of FIG. 2, according to an embodiment of the present invention. The IP-based node 54, implemented for example as an H.323 compliant gatekeeper modified as disclosed herein, includes an IP interface 64, a processor 66, and a circuit allocation table 68.

The circuit allocation table 68 is configured for storing trunk group entries 70, wherein each trunk group entry (e.g., 70*a*) corresponds to a unique circuit of the super trunk group 52. In particular, each trunk group entry 70 includes an IP gateway address 72, a gateway trunk group label (TGL) 74, a circuit identification code (CIC) 76, a service status field (S) 78, and an allocated field (A) 80. The IP gateway address 72 specifies the IP address of the gateway 56 configured for controlling the corresponding connected circuit; the trunk group label 74 specifies the trunk group identifier used by the gateway 56 in identifying the corresponding trunk group 60 containing the corresponding circuit identified by the circuit identification code 76. Hence, the gatekeeper 54 can uniquely identify any circuit within the super trunk group 52, and its corresponding trunk group 60 and gateway 56, based on its corresponding trunk group entry 70.

Each trunk group entry 70 also includes a service status field 78 configured for specifying whether the corresponding circuit is in-service or out-of-service, and an allocation field 80 configured for specifying whether the allocation status for the corresponding circuit is "free", or "busy".

As illustrated in FIG. 3A, the processor 66 includes a table manager 82 configured for establishing the super trunk group 52 by storing the trunk group entries 70 in the circuit allocation table 54. The table manager 82 also updates the service status field 78 in response to status messages 106 from a gateway 56, illustrated in FIG. 7, and updates the allocation field 80 based on IP-based RAS signaling messages from the gateways 56 such as the DRQ message 112 illustrated in FIG. 7. Hence, a VoIP protocol parser 84 parses any received H.225 Registration, Admission, and Status (RAS) message (e.g., Registration Request (RRQ) message, Disengage Request (DRQ) message, etc.), and forwards the received message to the table manager 82 for updating of the circuit allocation table 54.

The processor 66 also includes selector logic 86 configured for selecting an available circuit from the circuit allocation table 54, for example in response to reception of an H.225 Setup message from an originating gateway during call setup. The selector logic 86, upon selecting one of the in-service circuits that are available based on the service status field 78 and the allocation field 80, respectively, sets the corresponding allocated field 80 to specifying "in use", and generates an IP-based circuit selection message in the form of an H.323 call setup message to be output to the destination gateway 56.

Figure 6:
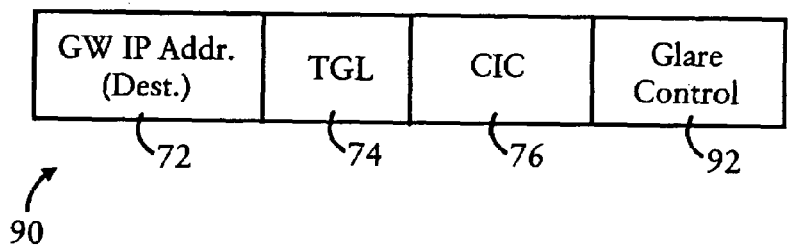
FIG. 6 is a diagram illustrating the call setup message output by the gatekeeper of FIG. 2.

FIG. 6 is a diagram illustrating the H.323 call setup message 90 generated by the selector 86 and output by the IP interface 64 to the destination gateway 56. In particular, the call setup message 90, also referred to as an IP-based selection message, specifies the destination IP address 72, the trunk group label 74, the CIC 76, and a glare control indicator 92. The call setup message 90 may be implemented according to H.323, version 4 (v4), where the trunk group label 74 is stored in the "group" field in the H.323 v4 destinationCircuitId structure; a "member" field is then added within the destinationCircuitID structure to specify the CIC value 76. Preferably the glare control indicator 92 is implemented as a single bit, where a value of "1" represents that the outgoing call initiated by the gateway 56 has precedence over incoming calls by the PSTN switch 10, and a value of "0" represents that the incoming call initiated by the PSTN switch 10 has precedence over the outgoing call by the gateway 56. In addition, the glare control indicator 92 can be implemented using a glareControl field added to the H.323 v4 circuitInfo structure, enabling the glare control indicator 92 to be transported along the call establishment path.

Figure 3B:
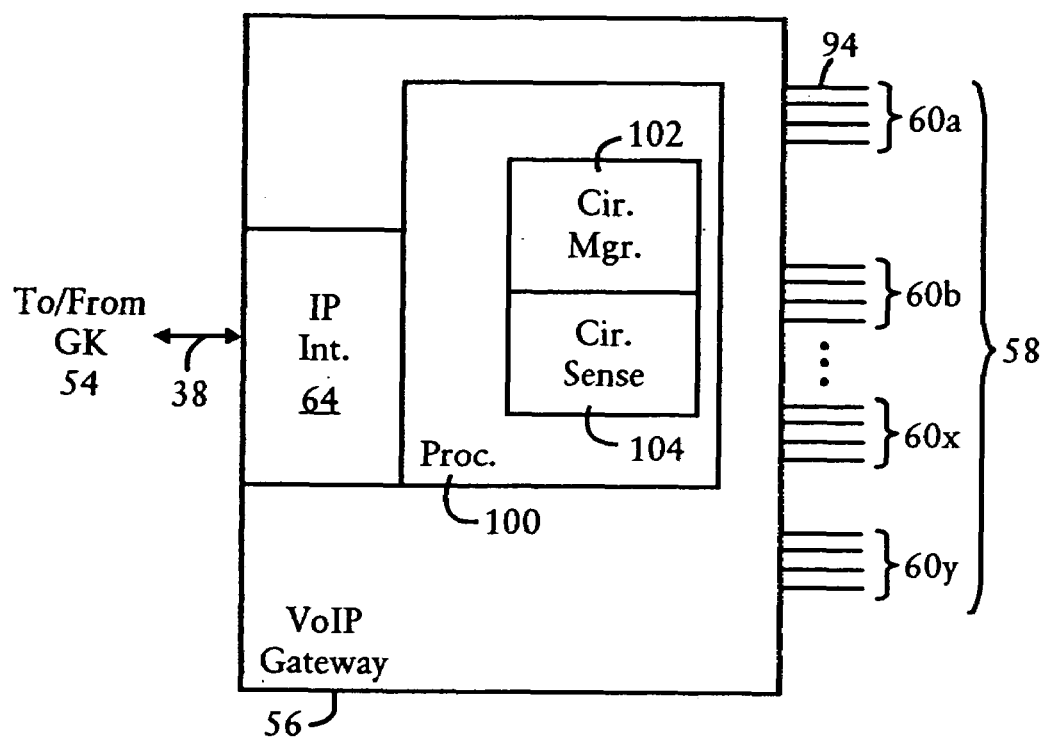

FIG. 3B is a diagram illustrating in detail a gateway 56, according to an embodiment of the present invention. The gateway 56 includes an IP interface 64 configured for sending H.225 RAS messages to the gatekeeper 54, and receiving the selection messages 90. The gateway 56 also includes a set 58 of connected trunk groups 60, where each trunk group 60 includes a plurality of circuits 94 having respective unique circuit identification codes 76.

The gateway 56 also includes a processor 100 having a circuit manager 102 and a circuit sense 104. The circuit manager 102 is configured for initiating an outgoing call on a circuit 94 for initiation of a connection with the PSTN switch 10, and releasing the circuit 94 at the end of a call to complete the disconnect operation. The circuit sense 104 is configured for detected whether the PSTN switch 10 is attempting to seize a circuit 94 for an incoming call initiated by the PSTN switch 10.

Hence, the processor 100, in response to receiving a call setup message 90, determines from the circuit sense 104 whether the circuit 94 specified by the circuit identifier 76 within the call setup message 90 is in use or whether the PSTN switch 10 is attempting to seize the circuit; if the processor 100 determines that the PSTN switch 10 is attempting to seize the circuit identified by the CIC 76 in the call setup message 90, the processor 100 selectively either initiates an outgoing call on the circuit, or abandons the attempt to initiate an outgoing call on the circuit 94, based on whether the glare control indicator 92 specifies whether the outgoing call by the gateway 56 has precedence, or the incoming call by the PSTN switch 10 has precedence.

Figure 7:
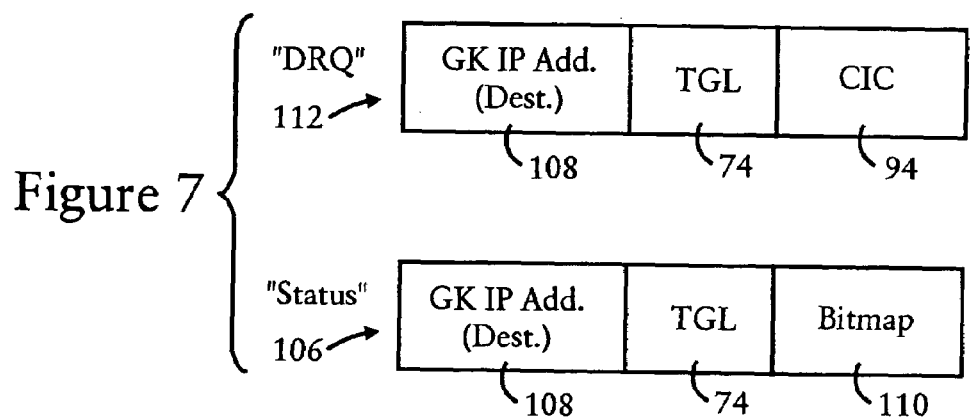
FIG. 7 is a diagram illustrating status messages output by the gateways of FIG. 2 to the gatekeeper.

The processor 100 also is configured for outputting H.225 messages specifying circuit allocation and service status to the gatekeeper 54 for use by the gatekeeper 54 in managing the circuit allocation table 68. As illustrated in FIG. 7, and as described below with respect to FIGS. 4 and 5, the processor 100 is configured for sending an IP-based status message 106 for a trunk group 60, for example on a periodic basis or in response to a detected event. In particular, the status message 106 includes a destination IP address 108 that specifies the IP address of the gatekeeper 54, a trunk group label 74, and a bitmap 110. The bitmap 110 specifies in sequence whether the circuits 94 for the specified trunk group (e.g., 60a) are in-service or out-of-service; hence, the gateway 56 can specify the service status for an entire trunk group 60, without the necessity of specifying each individual CIC 76.

The processor 100 also is configured for outputting H.225 messages, including a Setup message or a Disengage Request (DRQ) message 112, in response to a detected condition on a specific circuit 94. The DRQ message 112 specifies the trunk group label 74 for the affected from group 60, and the CIC 76 for the affected circuit 94. Hence, the gatekeeper 54, in response to receiving a DRQ message 112, can update the corresponding allocation field value 80 for the trunk group entry 70 corresponding to the identified circuit 94.

Figure 4A:
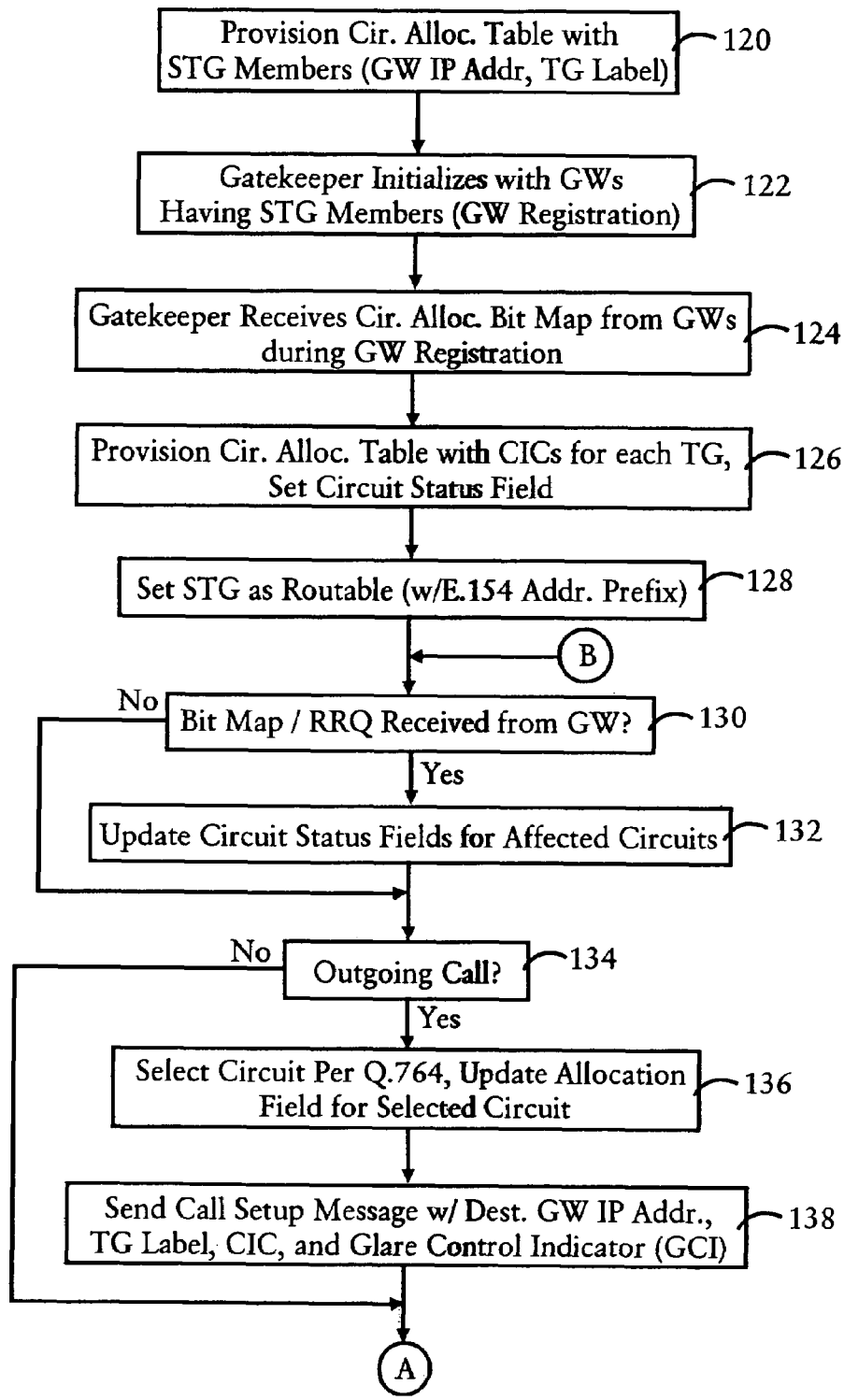
FIGS. 4A and 4B are diagrams summarizing the method by the gatekeeper of FIG. 2 of managing the multiple gateway trunk groups based on received status messages, and sending call setup messages including glare control indicators, according to an embodiment of the present invention.
Figure 4B:
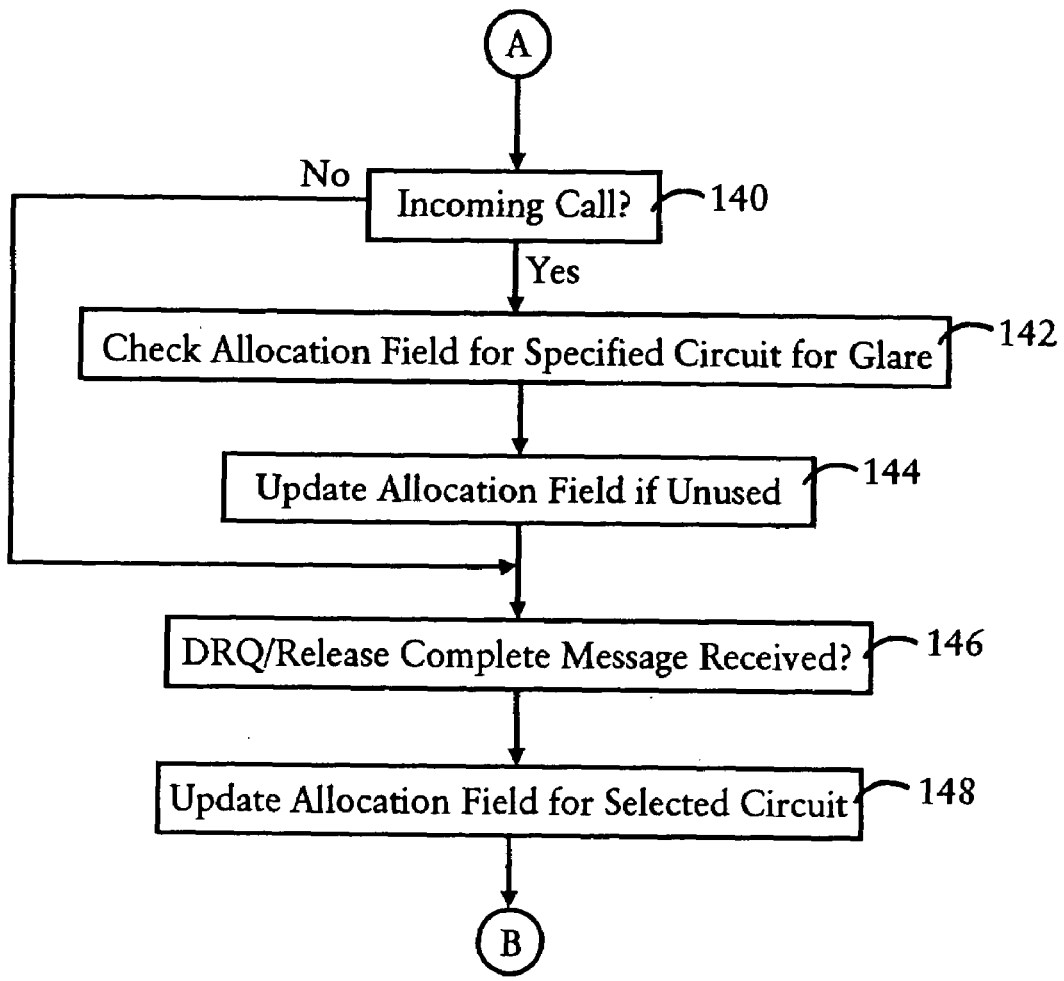
Figure 5:
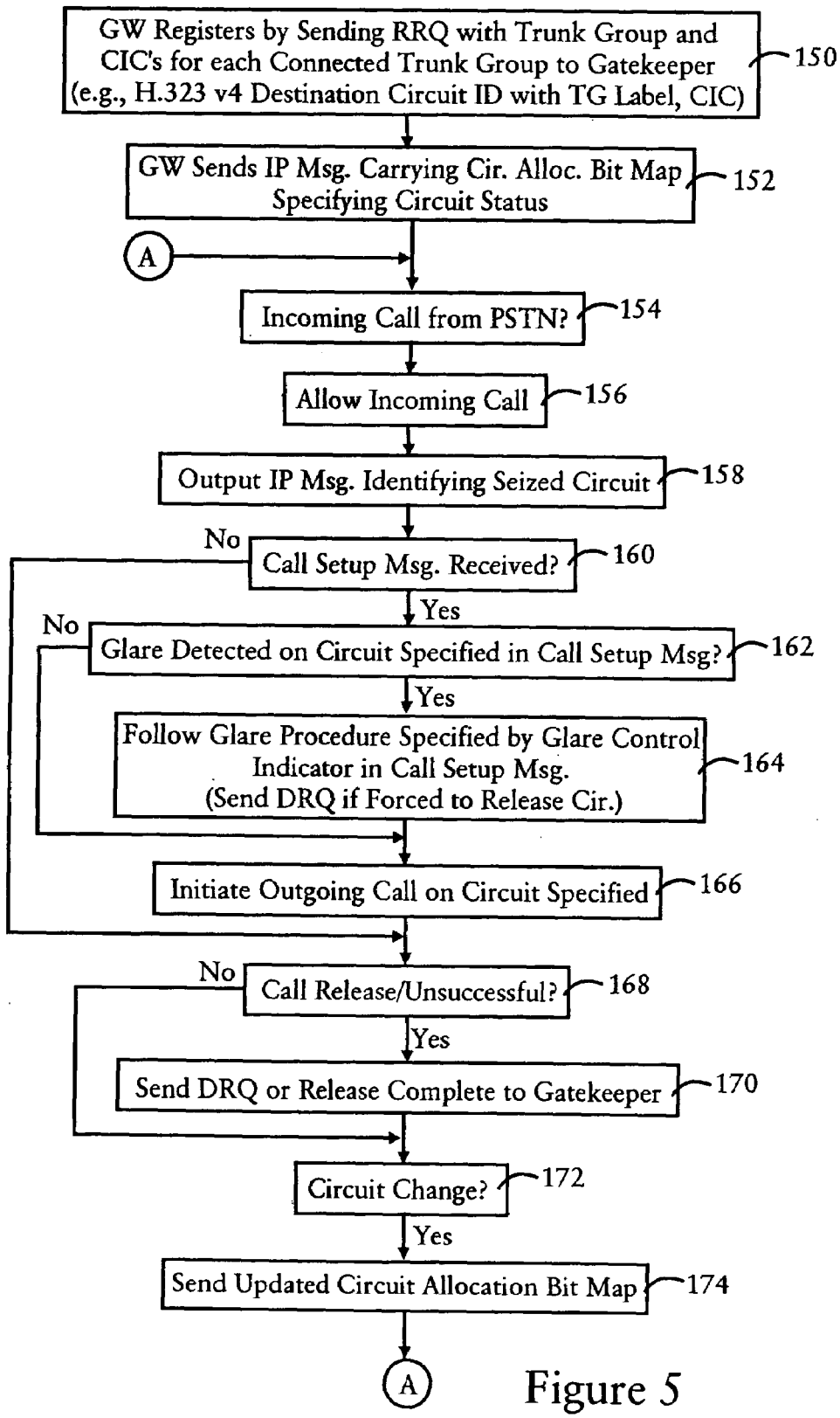
FIG. 5 is a diagram illustrating the method of selectively initiating an outgoing call by one of the gateways of FIG. 2, according to an embodiment of the present invention.

FIGS. 4A and 4B are diagrams summarizing the method by the gatekeeper 54 of establishing the super trunk group 52, and controlling the gateways 56 associated with the super trunk group 52 during call processing, according to an embodiment of the present invention. FIG. 5 is a diagram illustrating the method by the gateways 56 of notifying the gatekeeper 54 of service status for the respective sets of connected trunk groups, and circuit selection and glare arbitration based on messages received from the gatekeeper 54, according to an embodiment of the present invention. The steps described in FIGS. 4A and 4B can be implemented as executable code stored on a computer readable medium (e.g., a hard disk drive, a floppy drive, a random access memory, a read only memory, an EPROM, a compact disk, etc.) accessible for execution by the gatekeeper 54. Similarly, the steps described in FIG. 5 can be implemented as executable code stored on a computer readable medium accessible for execution by the gateways 56.

The method of FIG. 4A begins in step 120, where the gatekeeper 54 provisions the circuit allocation table 68 with super trunk group members (i.e., trunks 60 belonging to the super trunk group 52) by the table manager 82 creating trunk group entries 70 having at least the gateway IP address 72 and the trunk group label 74. Note that the initial provisioning in step 120 may be done by the table manager 82 based on prescribed discovery routines utilized by the gatekeeper 54 and based on prescribed RAS registration procedures, including receiving an RRQ from a gateway 56. Hence, the gatekeeper 54 performs initialization routines in step 122 with each of the gateways 56 determined as members of the super trunk group 52.

The gatekeeper 54 receives in step 124 a status message 106 from each of the registered gateways 56 that includes a corresponding circuit application bitmap 110 specifying the status of each of the circuits 94 for the corresponding identified group 60. As apparent from the foregoing, the processor 66 in the gatekeeper 54 may either dynamically generate in step 126 a CIC 76 for each corresponding trunk group entry 70 and generate the corresponding service status value 78 based on the received circuit bitmap 110, or alternately the CIC values 76 may be loaded manually within the CIC field 76 of the circuit allocation table 68 and the gateways 56, followed by setting the service status field 78 following insertion of the CIC values 76.

The table manager 82 in the processor 66 initially sets the allocated fields 80 for the trunk group entries 70 having an in-service value for the service status field 78 to an unused status, and the processor 66 sets in step 128 the super trunk group 52 to a routable status having a corresponding E.154 address prefix, placing the super trunk group 52 into service.

During operations, the processor 66 within the gatekeeper 54 monitors for received messages from any one of the gateways 56 that may affect the service status for circuit selection. For example, if in step 130 the processor 66 determines that the IP interface 64 of the gatekeeper 54 receives a status message 106 carrying a bitmap 110, or an RRQ message 112 from a new gateway 56, the table manager 82 updates in step 132 the service status field 78 in response to a bitmap 110, or the allocation field 80 for a corresponding specified circuit in response to reception of a DRQ message 112.

Assume in step 134 that the gatekeeper 54 receives a request for an outgoing call, for example in the form of a resource request from another gatekeeper in the voice over IP network 62. The selector 86 within the gatekeeper 54 selects in step 136 an in-service circuit that is available from the circuit allocation table 68 in accordance with Q.764, and updates the corresponding allocation field 80 to specify that the selected circuit is in use. The selector 86 than generates in step 138 a call setup message 90, illustrated in FIG. 6, and sends in step 138 the call setup message 90 with the destination gateway IP address 72, the trunk group label 74, the CIC 76, and the glare control indicator 92.

Referring to FIG. 4B, if the processor 66 detects in step 140 a RAS message 112 indicating an incoming call on an identified circuit of the super trunk group 52, the processor 66 checks in step 142 the corresponding allocation field 80 for the corresponding trunk group entry 70 for the specified circuit, and updates the allocation field 80 in step 144 if the allocation field specifies the circuit currently is unused.

If in step 146 a DRQ message or release complete message 112 is received, for example due to a release call, or due to a gateway 56 avoiding initiating an outgoing call on a line due to glare arbitration granting priority to the incoming call, the allocation field for the selected circuit is updated in step 148. Note that for glare conditions where an alternative circuit selection is necessary due to precedence being granted to the incoming call from the PSTN switch 10, the process at step 130 may be repeated to find an alternative circuit in step 136.

FIG. 5 is a flow diagram illustrating the method by each of the gateways 56 in performing call processing based on the call setup messages 90 received from the gatekeeper 54, according to an embodiment of the present invention. Each gateway 56 registers in step 150, as described above with respect to step 122, by sending RRQ messages that include the trunk group label 74, and the CIC values 76 for each connected trunk group 60. Once the trunk group 60 and its associated circuits 94 have been identified to the gatekeeper 54, the processor 100 outputs in step 152 a status message 106 including the circuit service status bitmap 110 specifying the service status for each of the identified circuits 94 of the trunk group 60 specified in the corresponding trunk group label 74.

During normal call operations, the circuit sense 104 monitors the circuits 94 of the set 58 of connected trunk groups 60 to determine in step 154 whether the PSTN switch 10 is attempting to seize a circuit 94 for an incoming call. Assuming no glare condition is encountered, the circuit manager 102 allows the incoming call in step 156, and the processor 100 outputs in step 158 an IP message 112 identifying the seized circuit 158, enabling the gatekeeper 54 to update its internal allocation field 80 for the corresponding trunk group entry 70.

Assuming in step 160 that the gateway 56 receives a call setup message 90 from the gatekeeper 54, the processor 100 determines in step 162 whether the circuit sense 104 detects glare, where the PSTN switch 10 is attempting to simultaneously seize the same circuit specified in the call setup message 90. If in step 162 glare is detected, the circuit manager 102 implements in step 164 the glare procedure specified by the glare control indicator 92 in the call setup message 90. In particular, if the glare control indicator 92 specifies that outgoing calls have precedence (as assumed in FIG. 5), the circuit manager 102 initiates the outgoing call in step 166 on the specified circuit; however if the glare control indicator 92 specifies that incoming calls from the PSTN switch 10 have precedence, the processor 100 outputs a DRQ message 112 back to the gatekeeper 54 indicating the cause to be glare, in order to enable the gatekeeper 54 to select an alternative circuit.

Upon termination of the circuit connection in step 168, for example due to a call release, or due to an unsuccessful connection, the processor 100 outputs in step 170 a DRQ message 112 or a release complete message to the gatekeeper 54, enabling the gatekeeper 54 to update the corresponding allocation field 80.

The processor 100 continuously monitors for changes in the status of the in-service circuits 94, for example a hardware failure, etc. If the processor 100 detects in step 172 a circuit change, the processor 100 outputs in step 174 and updated circuit service status bitmap 110 within a status message 106, enabling the gatekeeper 54 to update the appropriate service status field 78 for the affected trunk group entries 70.

According to the disclosed embodiment, circuit selection and glare arbitration is centrally managed within a gatekeeper based on reception of status messages from the gateways controlling the trunk groups, and based on circuit selection messages (i.e., call setup messages) output by the gatekeeper to the corresponding gateway controlling the selected circuit. Hence, a super trunk group can be established that corresponds to a PSTN trunk group, enabling deployment of a scalable and cost-effective voice over IP network compatible with PSTN trunk groups and that minimize the occurrence of glare with the PSTN switch.

Although the disclosed embodiment has been described in connection with H.323 protocol and alternatively SIP protocol, it will be appreciated that other IP based telephony protocols also may be used between the devices controlling the trunk group circuits, and the centralized IP based node configured for controlling circuit selection and resource allocation for IP based media connections.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an Internet Protocol (IP)-based node, the method including:
    establishing a prescribed trunk group having multiple sets of connected trunk groups coupled to respective IP-based gateway devices, the establishing including storing trunk group entries within a table, each trunk group entry specifying an address for one of the IP-based gateway devices and an identified one of the connected trunk groups from the corresponding set of connected trunk groups;
    selecting a circuit from a selected one of the connected trunk groups for connection with a switch having a peer trunk group interfacing with the prescribed trunk group; and
    outputting an IP-based selection message, identifying the selected circuit for the connection with the switch, to the corresponding IP-based gateway device configured for controlling the selected one connected trunk group.

2. The method of claim 1, further comprising receiving an IP-based status message from one of the IP-based gateway devices that includes status information for circuits of an identified one of the corresponding connected trunk groups, the storing including storing, for each trunk group entry identifying the identified one connected trunk group, a circuit identifier for a corresponding circuit unique to the corresponding identified one connected trunk group, and a service status indicator specifying whether the corresponding circuit is in-service.

3. The method of claim 2, wherein the storing of trunk group entries further includes parsing a circuit service status bit map, within the status information of the received IP-based status message and that specifies a status for each corresponding circuit of the identified one connected trunk group, for the service status indicator.

4. The method of claim 2, wherein each trunk group entry includes an allocated field value specifying whether the corresponding circuit has been allocated for a corresponding connection with the switch, the selecting including selecting the circuit based on identifying a trunk group entry having a service status indicator indicating the corresponding circuit is in-service, and an allocated field value specifying that the corresponding circuit has not been allocated.

5. The method of claim 4, further comprising:
    receiving a second IP-based message from the one IP-based gateway that specifies one of the corresponding connected trunk groups, the circuit identifier for a corresponding one of the circuits, and a status of the corresponding one circuit; and
    updating one of the service status indicator and the allocated field value for the trunk group entry corresponding to the one connected trunk group and circuit identifier specified in the second IP-based message.

6. The method of claim 1, wherein outputting includes specifying, within the IP-based selection message, a glare control indicator specifying a prescribed glare protocol operation to be performed by the corresponding IP-based gateway in response to detection of glare by the IP-based gateway.

7. The method of claim 6, wherein the outputting includes inserting, within the IP-based selection message, an IP address for the IP-based gateway device having the selected circuit, an identifier for the for the corresponding identified one trunk group having the selected circuit, and the corresponding circuit identifier for the selected circuit.

8. A method in an Internet Protocol (IP)-based gateway having a set of connected trunk groups for connection to at least a portion of a peer trunk group of a switch, the method comprising:
  sending, to an IP-based node via an IP network, an IP-based message that specifies a trunk group identifier for a group of circuits, and status information for the group of circuits;
  receiving, via the IP network, a call setup message that specifies one of the connected trunk groups, a circuit identifier, and a glare control indicator that specifies a prescribed glare arbitration;
  determining whether the switch is attempting to seize the circuit specified by the circuit identifier for the one connected trunk group; and
  selectively initiating an outgoing call on the circuit specified by the circuit identifier for the one connected trunk group, based on the determining whether the switch is attempting to seize the circuit and the glare control indicator.

9. The method of claim 8, wherein the selectively initiating includes determining whether the glare control indicator specifies whether the IP-based gateway has precedence for outgoing calls on the circuit, relative to incoming calls initiated by the switch.

10. The method of claim 9, wherein the selectively initiating includes initiating the outgoing call on the circuit according to Q.764 protocol according to one of a determined availability of the circuit and a determined precedence for the circuit.

11. The method of claim 8, further comprising outputting a second IP-based message specifying the circuit identifier for the circuit, a trunk group identifier for the corresponding one connected trunk group, and a release complete message specifying a glare detection cause, based on the determining whether the switch is attempting to seize the circuit and the glare control indicator specifying the switch has precedence for the circuit.

12. The method of claim 8, further comprising:
  detecting a release condition following initiating the outgoing call on the circuit by the IP-based gateway; and
  outputting a second IP-based message specifying the circuit identifier for the circuit, a trunk group identifier for the corresponding one connected trunk group, and a message specifying the release condition indicating an availability of the circuit.

13. The method of claim 8, further comprising:
  detecting a changed status in at least one of the circuits; and
  outputting a second IP-based message that specifies the trunk group identifier for the group of circuits including the at least one circuit, and status information that specifies at least the changed status for the one circuit.

14. An Internet Protocol (IP)-based node comprising:
  a table configured for storing trunk group entries, each trunk group entry specifying an address, for an IP-based gateway device having a set of connected trunk groups, and an identified one of the connected trunk groups;
  a processor configured for establishing a prescribed trunk group from multiple sets of the connected trunk groups coupled to a respective plurality of the IP-based gateway devices, the processor configured for updating one of the trunk group entries based on selecting a circuit from a corresponding selected one of the connected trunk groups for connection with a switch having a peer trunk group interfacing with the prescribed trunk group; and
  an IP interface configured for outputting an IP-based selection message, generated by the processor and identifying the selected circuit for the connection with the switch, to the corresponding IP-based gateway device configured for controlling the selected one connected trunk group.

15. The node of claim 14, wherein the IP interface is configured for receiving an IP-based status message from one of the IP-based gateway devices that includes status information for circuits of an identified one of the corresponding connected trunk groups, the processor configured for storing, for each trunk group entry identifying the identified one connected trunk group, a circuit identifier for a corresponding circuit unique to the corresponding identified one connected trunk group, and a service status indicator specifying whether the corresponding circuit is in-service.

16. The node of claim 15, wherein the processor is configured for parsing a circuit service status bit map, within the status information of the received IP-based status message and that specifies a status for each corresponding circuit of the identified one connected trunk group, for the service status indicator.

17. The node of claim 15, wherein each trunk group entry includes an allocated field value specifying whether the corresponding circuit has been allocated for a corresponding connection with the switch, the processor configured for selecting the circuit based on identifying a trunk group entry having a service status indicator indicating the corresponding circuit is in-service, and an allocated field value specifying that the corresponding circuit has not been allocated.

18. The node of claim 17, wherein:
  the IP interface is configured for receiving a second IP-based message from the one IP-based gateway that specifies one of the corresponding connected trunk groups, the circuit identifier for a corresponding one of the circuits, and a status of the corresponding one circuit; and
  the processor is configured for updating one of the service status indicator and the allocated field value for the trunk group entry corresponding to the one connected trunk group and circuit identifier specified in the second IP-based message.

19. The node of claim 14, wherein processor is configured for specifying, within the IP-based selection message, a glare control indicator specifying a prescribed glare protocol operation to be performed by the corresponding IP-based gateway in response to detection of glare by the IP-based gateway.

20. The node of claim 19, wherein the processor is configured for inserting, within the IP-based selection message, an IP address for the IP-based gateway device having the selected circuit, an identifier for the for the corresponding identified one trunk group having the selected circuit, and the corresponding circuit identifier for the selected circuit.

21. An Internet Protocol (IP)-based gateway having a set of connected trunk groups for connection to at least a portion of a peer trunk group of a switch, the IP-based gateway further comprising:

an IP interface configured for sending, to an IP-based node via an IP network, an IP-based message that specifies a trunk group identifier for a group of circuits, and status information for the group of circuits, the IP interface configured for receiving, via the IP network, a call setup message that specifies one of the connected trunk groups, a circuit identifier, and a glare control indicator that specifies a prescribed glare arbitration; and a processor configured for determining whether the switch is attempting to seize the circuit specified by the circuit identifier for the one connected trunk group, the processor configured for selectively initiating an outgoing call on the circuit specified by the circuit identifier for the one connected trunk group, based on whether the switch is attempting to seize the circuit and based on the glare control indicator.

22. The IP-based gateway of claim 21, wherein the processor is configured for determining whether the glare control indicator specifies whether the IP-based gateway has precedence for outgoing calls on the circuit, relative to incoming calls initiated by the switch.

23. The IP-based gateway of claim 22, wherein the processor is configured for initiating the outgoing call on the circuit according to Q.764 protocol according to one of a determined availability of the circuit and a determined precedence for the circuit.

24. The IP-based gateway of claim 21, wherein the processor is configured for generating a second IP-based message specifying the circuit identifier for the circuit, a trunk group identifier for the corresponding one connected trunk group, and a release complete message specifying a glare detection cause, based on determining the switch is attempting to seize the circuit and based on the glare control indicator specifying the switch has precedence for the circuit.

25. The IP-based gateway of claim 21, wherein the processor further is configured for:

detecting a release condition following initiating the outgoing call on the circuit by the IP-based gateway; and
generating a second IP-based message specifying the circuit identifier for the circuit, a trunk group identifier for the corresponding one connected trunk group, and a message specifying the release condition indicating an availability of the circuit.

26. The IP-based gateway of claim 21, wherein the processor further is configured for:

detecting a changed status in at least one of the circuits; and
generating a second IP-based message that specifies the trunk group identifier for the group of circuits including the at least one circuit, and status information that specifies at least the changed status for the one circuit.

27. A computer readable medium having stored thereon sequences of instructions for establishing a prescribed trunk group, the sequences of instructions including instructions for performing the steps of:

establishing a prescribed trunk group having multiple sets of connected trunk groups coupled to respective IP-based gateway devices, the establishing step including storing trunk group entries within a table, each trunk group entry specifying an address for one of the IP-based gateway devices and an identified one of the connected trunk groups from the corresponding set of connected trunk groups;

selecting a circuit from a selected one of the connected trunk groups for connection with a switch having a peer trunk group interfacing with the prescribed trunk group; and outputting an IP-based selection message, identifying the selected circuit for the connection with the switch, to the corresponding IP-based gateway device configured for controlling the selected one connected trunk group.

28. The medium of claim 27, further comprising instructions for performing the step of receiving an IP-based status message from one of the IP-based gateway devices that includes status information for circuits of an identified one of the corresponding connected trunk groups, the storing step including storing, for each trunk group entry identifying the identified one connected trunk group, a circuit identifier for a corresponding circuit unique to the corresponding identified one connected trunk group, and a service status indicator specifying whether the corresponding circuit is in-service.

29. The medium of claim 28, wherein the storing step further includes parsing a circuit service status bit map, within the status information of the received IP-based status message and that specifies a status for each corresponding circuit of the identified one connected trunk group, for the service status indicator.

30. The medium of claim 28, wherein each trunk group entry includes an allocated field value specifying whether the corresponding circuit has been allocated for a corresponding connection with the switch, the selecting step including selecting the circuit based on identifying a trunk group entry having a service status indicator indicating the corresponding circuit is in-service, and an allocated field value specifying that the corresponding circuit has not been allocated.

31. The medium of claim 30, further comprising instructions for performing the steps of:

receiving a second IP-based message from the one IP-based gateway that specifies one of the corresponding connected trunk groups, the circuit identifier for a corresponding one of the circuits, and a status of the corresponding one circuit; and updating one of the service status indicator and the allocated field value for the trunk group entry corresponding to the one connected trunk group and circuit identifier specified in the second IP-based message.

32. The medium of claim 27, wherein outputting step includes specifying, within the IP-based selection message, a glare control indicator specifying a prescribed glare protocol operation to be performed by the corresponding IP-based gateway in response to detection of glare by the IP-based gateway.

33. The medium of claim 32, wherein the outputting step includes inserting, within the IP-based selection message, an IP address for the IP-based gateway device having the selected circuit, an identifier for the for the corresponding identified one trunk group having the selected circuit, and the corresponding circuit identifier for the selected circuit.

34. A computer readable medium having stored thereon sequences of instructions for establishing a connection on a circuit by an Internet Protocol (IP)-based gateway having a set of connected trunk groups for connection to at least a portion of a peer trunk group of a switch, the sequences of instructions including instructions for performing the steps of:

sending, to an IP-based node via an IP network, an IP-based message that specifies a trunk group identifier for a group of circuits, and status information for the group of circuits;

receiving, via the IP network, a call setup message that specifies one of the connected trunk groups, a circuit identifier, and a glare control indicator that specifies a prescribed glare arbitration;

determining whether the switch is attempting to seize the circuit specified by the circuit identifier for the one connected trunk group; and selectively initiating an outgoing call on the circuit specified by the circuit identifier for the one connected trunk group, based on the determining step and the glare control indicator.

35. The medium of claim 34, wherein the selectively initiating step includes determining whether the glare control indicator specifies whether the IP-based gateway has precedence for outgoing calls on the circuit, relative to incoming calls initiated by the switch.

36. The medium of claim 35, wherein the selectively initiating step includes initiating the outgoing call on the circuit according to Q.764 protocol according to one of a determined availability of the circuit and a determined precedence for the circuit.

37. The medium of claim 34, further comprising instructions for performing the step of outputting a second IP-based message specifying the circuit identifier for the circuit, a trunk group identifier for the corresponding one connected trunk group, and a release complete message specifying a glare detection cause, based on the determining step and the glare control indicator specifying the switch has precedence for the circuit.

38. The medium of claim 34, further comprising instructions for performing the steps of:

detecting a release condition following initiating the outgoing call on of the circuit by the IP-based gateway; and outputting a second IP-based message specifying the circuit identifier for the circuit, a trunk group identifier for the corresponding one connected trunk group, and a message specifying the release condition indicating an availability of the circuit.

39. The medium of claim 34, further comprising instructions for performing the steps of:

detecting a changed status in at least one of the circuits; and outputting a second IP-based message that specifies the trunk group identifier for the group of circuits including the at least one circuit, and status information that specifies at least the changed status for the one circuit.

40. An Internet Protocol (IP)-based node comprising:

means for establishing a prescribed trunk group having multiple sets of connected trunk groups coupled to respective IP-based gateway devices, the establishing means configured for storing trunk group entries within a table, each trunk group entry specifying an address for one of the IP-based gateway devices and an identified one of the connected trunk groups from the corresponding set of connected trunk groups;

means for selecting a circuit from a selected one of the connected trunk groups for connection with a switch having a peer trunk group interfacing with the prescribed trunk group; and means for outputting an IP-based selection message, identifying the selected circuit for the connection with the switch, to the corresponding IP-based gateway device configured for controlling the selected one connected trunk group.

41. The IP-based node of claim 40, wherein the outputting means is configured for receiving an IP-based status message from one of the IP-based gateway devices that includes status information for circuits of an identified one of the corresponding connected trunk groups, the establishing means configured for storing, for each trunk group entry identifying the identified one connected trunk group, a circuit identifier for a corresponding circuit unique to the corresponding identified one connected trunk group, and a service status indicator specifying whether the corresponding circuit is in-service.

42. The IP-based node of claim 41, wherein the establishing means further is configured for parsing a circuit service status bit map, within the status information of the received IP-based status message and that specifies a status for each corresponding circuit of the identified one connected trunk group, for the service status indicator.

43. The IP-based node of claim 41, wherein each trunk group entry includes an allocated field value specifying whether the corresponding circuit has been allocated for a corresponding connection with the switch, the selecting means configured for selecting the circuit based on identifying a trunk group entry having a service status indicator indicating the corresponding circuit is in-service, and an allocated field value specifying that the corresponding circuit has not been allocated.

44. The IP-based node of claim 43, wherein:

the outputting means is configured for receiving a second IP-based message from the one IP-based gateway that specifies one of the corresponding connected trunk groups, the circuit identifier for a corresponding one of the circuits, and a status of the corresponding one circuit; and the establishing means is configured for updating one of the service status indicator and the allocated field value for the trunk group entry corresponding to the one connected trunk group and circuit identifier specified in the second IP-based message.

45. The IP-based node of claim 40, wherein outputting means is configured for specifying, within the IP-based selection message, a glare control indicator specifying a prescribed glare protocol operation to be performed by the corresponding IP-based gateway in response to detection of glare by the IP-based gateway.

46. The IP-based node of claim 45, wherein the outputting means is configured for inserting, within the IP-based selection message, an IP address for the IP-based gateway device having the selected circuit, an identifier for the for the corresponding identified one trunk group having the selected circuit, and the corresponding circuit identifier for the selected circuit.

47. An Internet Protocol (IP)-based gateway having a set of connected trunk groups for connection to at least a portion of a peer trunk group of a switch, the IP-based gateway further comprising:

means for sending, to an IP-based node via an IP network, an IP-based message that specifies a trunk group identifier for a group of circuits, and status information for the group of circuits, and receiving, via the IP network, a call setup message that specifies one of the connected trunk groups, a circuit identifier, and a glare control indicator that specifies a prescribed glare arbitration;

means for determining whether the switch is attempting to seize the circuit specified by the circuit identifier for the one connected trunk group; and means for selectively initiating an outgoing call on the circuit specified by the circuit identifier for the one connected trunk group, based on the determining step and the glare control indicator.

48. The IP-based gateway of claim 47, wherein the selectively initiating means is configured for determining whether the glare control indicator specifies whether the IP-based gateway has precedence for outgoing calls on the circuit, relative to incoming calls initiated by the switch.

49. The IP-based gateway of claim 48, wherein the selectively initiating means is configured for initiating the outgoing call on the circuit according to Q.764 protocol according to one of a determined availability of the circuit and a determined precedence for the circuit.

50. The IP-based gateway of claim 47, wherein the sending means is configured for outputting a second IP-based message specifying the circuit identifier for the circuit, a trunk group identifier for the corresponding one connected trunk group, and a release complete message specifying a glare detection cause, based on the determined attempt by the switch to seize the circuit and the glare control indicator specifying the switch has precedence for the circuit.

51. The IP-based gateway of claim 47, wherein:

the determining means is configured for detecting a release condition following initiating the outgoing call on the circuit by the IP-based gateway; and the sending means is configured for outputting a second IP-based message specifying the circuit identifier for the circuit, a trunk group identifier for the corresponding one connected trunk group, and a message specifying the release condition indicating an availability of the circuit.

52. The IP-based gateway of claim 47, wherein:

the determining means is configured for detecting a changed status in at least one of the circuits; and the sending means is configured for outputting a second IP-based message that specifies the trunk group identifier for the group of circuits including the at least one circuit, and status information that specifies at least the changed status for the one circuit.

* * * * *